(12) United States Patent
Folcarelli et al.

(10) Patent No.: US 8,491,014 B2
(45) Date of Patent: Jul. 23, 2013

(54) END CONNECTOR OF A CORRUGATED TUBE, PRODUCED BY CO-MOULDING

(75) Inventors: Alberto Folcarelli, Turin (IT); Walter Bertoldo, Turin (IT)

(73) Assignee: A.E.C. S.r.l., Turin (IT)

( * ) Notice: Subject to any disclaimer, the term of this patent is extended or adjusted under 35 U.S.C. 154(b) by 235 days.

(21) Appl. No.: 12/912,503

(22) Filed: Oct. 26, 2010

(65) Prior Publication Data

US 2012/0098253 A1 Apr. 26, 2012

(51) Int. Cl.
*F16L 13/00* (2006.01)

(52) U.S. Cl.
USPC .................. 285/286.1; 285/290.3; 285/293.1; 138/121

(58) Field of Classification Search
USPC ........... 285/260, 423, 425, 919, 293.1, 294.1, 285/285.1, 286.1, 290.1–290.4, 41; 138/121, 138/122, 109
See application file for complete search history.

(56) References Cited

U.S. PATENT DOCUMENTS

| | | | | |
|---|---|---|---|---|
| 3,493,251 A | * | 2/1970 | Kramer | 285/260 |
| 5,406,983 A | * | 4/1995 | Chambers et al. | 138/109 |
| 5,720,319 A | * | 2/1998 | Smith et al. | 138/109 |
| 5,762,108 A | * | 6/1998 | Hunter | 138/109 |
| 6,971,414 B2 | * | 12/2005 | Vohrer | 138/109 |
| 7,108,294 B1 | * | 9/2006 | Miller et al. | 285/286.1 |
| 2010/0310803 A1 | * | 12/2010 | Wallace | 428/36.9 |

FOREIGN PATENT DOCUMENTS

| | | |
|---|---|---|
| DE | 103 48 824 B3 | 5/2005 |
| EP | 0 154 926 A | 9/1985 |
| EP | 0 384 003 A | 8/1990 |
| EP | 2112415 A1 * | 10/2009 |
| GB | 2 292 433 A | 2/1996 |
| WO | WO 2005/039848 A2 | 6/2005 |

* cited by examiner

*Primary Examiner* — James Hewitt
*Assistant Examiner* — Jay R Ripley
(74) *Attorney, Agent, or Firm* — Merchant & Gould P.C.

(57) ABSTRACT

An end connector of a corrugated tube made of plastic material has a tubular elastomeric body produced by co-molding onto an end of the corrugated tube. The elastomeric body includes a connection portion arranged outside the corrugated tube and shaped for connection to an external component, and by an anchorage portion arranged inside the corrugated tube so as to fill grooves of the corrugated wall. A tubular insert which is made of plastic material and is partially incorporated in the elastomeric body and has a stem portion extending inside the corrugated tube and a flange portion which is in abutment with the end of the corrugated tube. The stem portion includes an anchorage zone provided with lateral ducts, in the region of the anchorage zone the stem portion of the insert is attached to the corrugated tube by the anchorage portion of the elastomeric body.

2 Claims, 7 Drawing Sheets

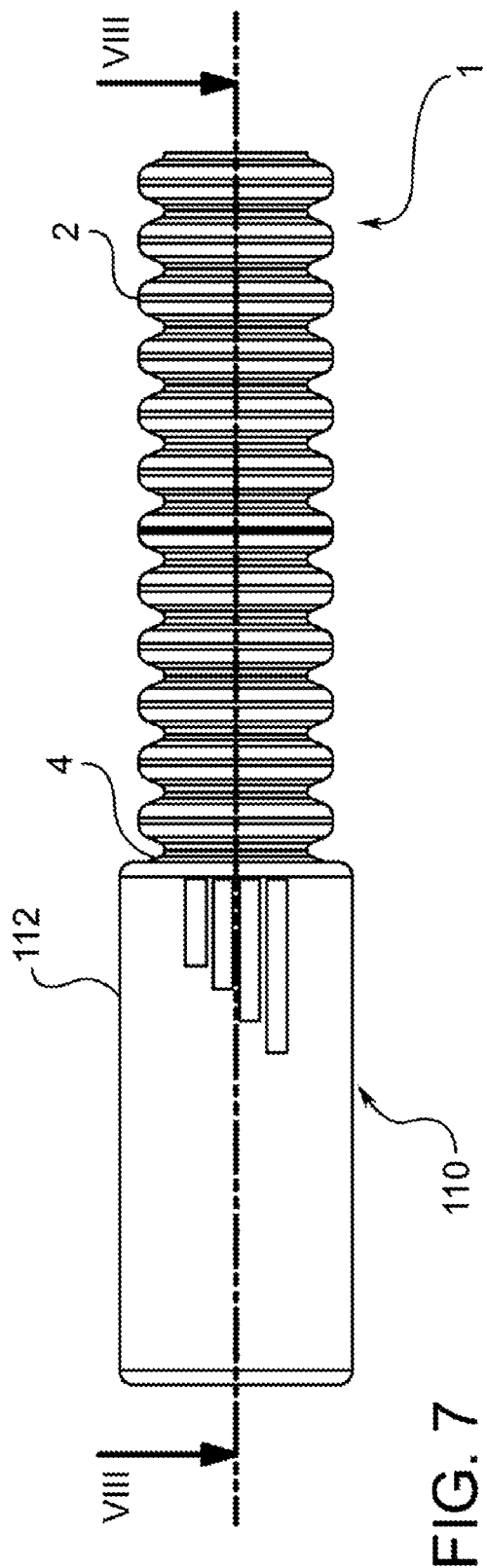
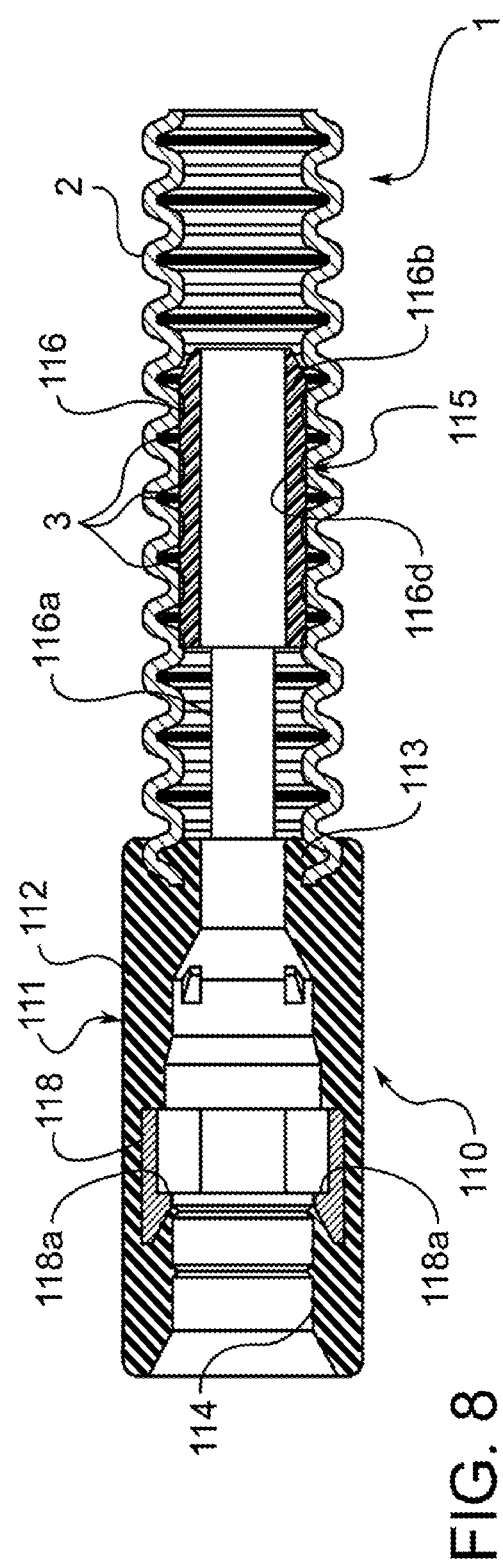

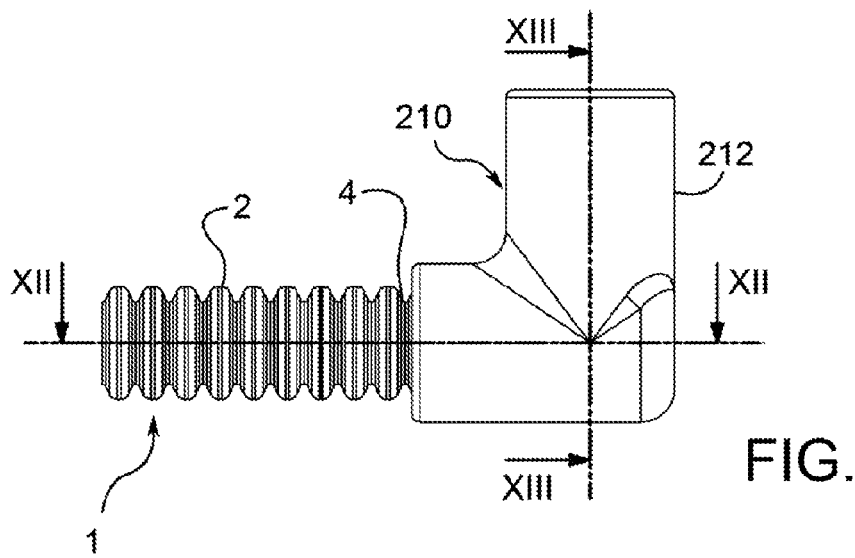
FIG. 11
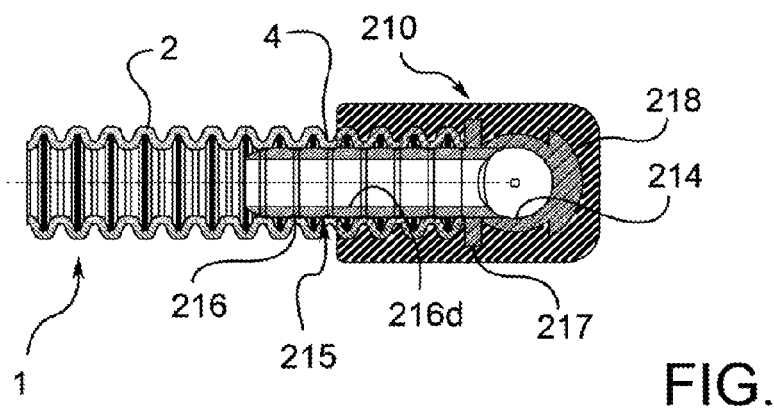
FIG. 12
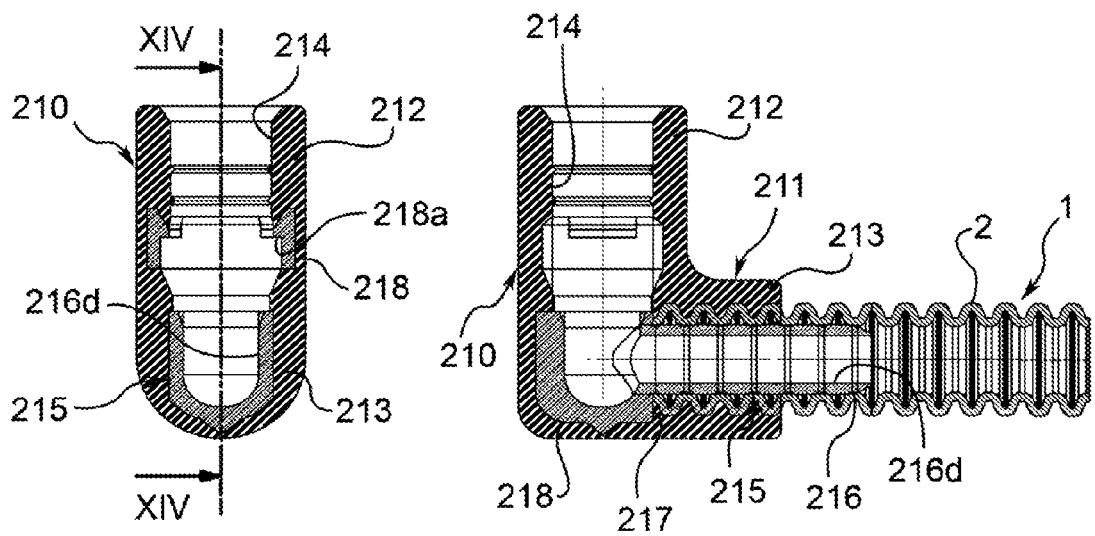
FIG. 13
FIG. 14

US 8,491,014 B2

END CONNECTOR OF A CORRUGATED TUBE, PRODUCED BY CO-MOULDING

BACKGROUND OF THE INVENTION

The present invention relates to an end connector of a corrugated tube made of plastics material.

Corrugated tubes are used, for example, in the production of vehicle front and rear screen-washing systems and the like and serve to interconnect various components of such systems such as pumps, nozzles and reservoirs.

SUMMARY OF THE INVENTION

An end connector according to the invention comprises:
- a tubular elastomeric body co-moulded onto an end of the corrugated tube, wherein the elastomeric body is constituted by a connection portion arranged outside the corrugated tube and shaped for connection to an external component, and by an anchorage portion arranged inside the corrugated tube so as to fill grooves of the corrugated wall thereof, and
- a tubular insert which is made of plastics material and is partially incorporated in the elastomeric body and which comprises a stem portion extending inside the corrugated tube and a flange portion which is in abutment with the end of the corrugated tube, the stem portion comprising an anchorage zone which is provided with lateral passages, in the region of which zone the stem portion of the insert is attached to the corrugated tube by means of the anchorage portion of the elastomeric body.

Another end connector according to the invention comprises:
- a tubular elastomeric body co-moulded onto an end of the corrugated tube, wherein the elastomeric body is constituted by a connection portion arranged outside the corrugated tube and shaped for connection to an external component, and by an anchorage portion arranged around the corrugated tube so as to fill outer grooves of the corrugated wall thereof, and
- a tubular insert which is made of plastics material and is partially incorporated in the elastomeric body and which comprises a stem portion extending inside the corrugated tube and an abutment portion which is in abutment with the end of the corrugated tube.

A further subject of the invention is a method of manufacturing an end connector of a corrugated tube, comprising the following steps:
- providing a corrugated tube made of plastics material,
- providing a tubular insert made of plastics material and comprising a stem portion and a flange portion, the stem portion comprising a proximal zone provided with lateral passages which also extend through the flange portion of the tubular insert,
- providing a mould comprising an inner portion which has a needle-like configuration and which can be inserted partially in the corrugated tube and an outer portion which can be closed as a shell around an end of the corrugated tube,
- inserting the tubular insert in the corrugated tube in a manner such as to bring the flange portion of the tubular insert into abutment with the end of the corrugated tube, the stem portion of the insert being substantially in contact with the corrugated wall of the corrugated tube,
- inserting the inner portion of the mould in the corrugated tube until a distal section of the inner portion is brought into engagement inside a distal zone of the stem portion of the insert, and closing the outer portion of the mould around the end of the corrugated tube,
- injecting an elastomeric material between the outer portion and the inner portion of the mould, the elastomeric material also penetrating into the interior of the corrugated tube through the lateral passages in the tubular insert, thus filling grooves of the corrugated wall of the corrugated tube which are in communication with the lateral ducts, and stopping at the level of the distal portion of the tubular insert,
- wherein the outer portion and the inner portion of the mould confer a predetermined profile on the elastomeric material remaining outside the corrugated tube so as to form, respectively, an internal duct and an external surface of a connection portion of the end connector, which connection portion is arranged outside the corrugated tube.

Another method of manufacturing according to the invention comprises the following steps:
- providing a corrugated tube made of plastics material,
- providing a tubular insert made of plastics material and comprising a stem portion, an abutment portion, and an engagement portion, the engagement portion being provided with lateral passages,
- providing a mould which can be closed as a shell around an end of the corrugated tube,
- providing a resin injection device which has a needle-like configuration and which can be inserted partially in the engagement portion of the insert,
- inserting the tubular insert in the corrugated tube in a manner such as to bring the abutment portion of the tubular insert into abutment with the end of the corrugated tube, the stem portion of the insert being substantially in contact with the corrugated wall of the corrugated tube,
- inserting the resin injection device in the engagement portion of the insert until a distal section of the injection device is brought into engagement inside a distal zone of the engagement portion of the insert, and closing the mould around the end of the corrugated tube,
- injecting an elastomeric material through the injection device, wherein the elastomeric material passes through the lateral passages of the engagement portion of the insert thus embedding the insert and the corrugated tube,
- wherein the mould and the injection device confer a predetermined profile on the elastomeric material remaining so as to form, respectively, an internal duct and an external surface of a connection portion of the end connector which connection portion is arranged outside the corrugated tube.

BRIEF DESCRIPTION OF THE DRAWINGS

A preferred but non-limiting embodiment of the invention will now be described with reference to the appended drawings in which:

FIG. 7 is an elevational view of a corrugated tube provided with an end connector according to a second embodiment of the invention, FIG. 8 is a section through the tube, taken on the line VIII-VIII of FIG. 7, FIGS. 9 and 10 are perspective views of an insert of the end connector of the tube of FIG. 7, FIG. 11 is an elevational view of a corrugated tube provided with an end connector according to a third embodiment of the invention, FIGS. 12 to 14 are sections through the tube, taken on the lines XII-XII of FIG. 7, XIII-XIII of FIG. 7 and XIV-XIV of FIG. 13, respectively.

DETAILED DESCRIPTION OF THE DRAWINGS

Figure 1:
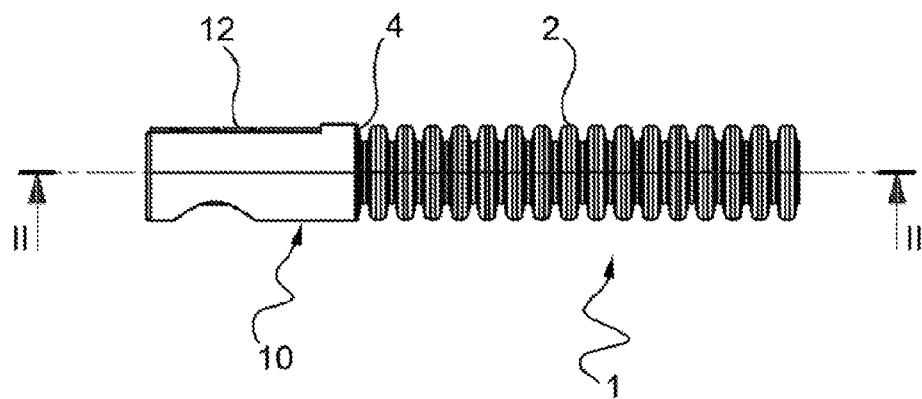
FIG. 1 is an elevational view of a corrugated tube provided with an end connector according to the invention.

The drawings show, in general, an end portion of a corrugated tube made of plastics material and generally indicated 1. The tube 1 comprises a corrugated wall 2 which defines a plurality of annular grooves 3 arranged in succession along the tube and facing the interior thereof.

Now, reference is made to FIGS. 1 to 6. In the region of the end 4 of the tube shown in the drawings there is an end connector, generally indicated 10, suitable for connecting the tube 1 to an external component (not shown). The end connector 10 comprises a tubular elastomeric body 11 produced by the co-moulding of an elastomeric material onto the end 4 of the corrugated tube 1.

The elastomeric body 11 is constituted by a connection portion 12 which is arranged outside the corrugated tube 1 and by an anchorage portion 13 which is arranged inside the corrugated tube 1 so as to fill some grooves 3 of the corrugated wall 2 thereof. The connection portion 12 has an internal duct 14 which is shaped for a leaktight connection between the connector 10 to the above-mentioned external component. The profile of the internal duct 14 is established at the design stage, according to the profile of the external component to which the tube 1 is to be connected. The outside diameter of the connection portion 12 is advantageously the same as the outside diameter of the corrugated tube 1 so as to produce an element with uniform transverse dimensions, thus avoiding any dimensional interference in the regions through which the tube must pass during its installation.

Figure 2:
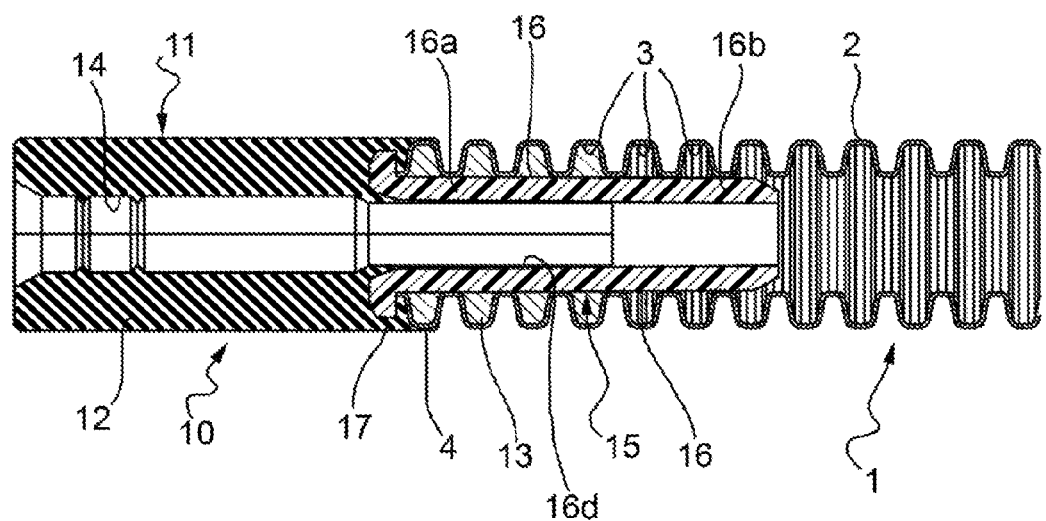
FIG. 2 is a section through the tube, taken on the line II-II of FIG. 1.
Figure 3:
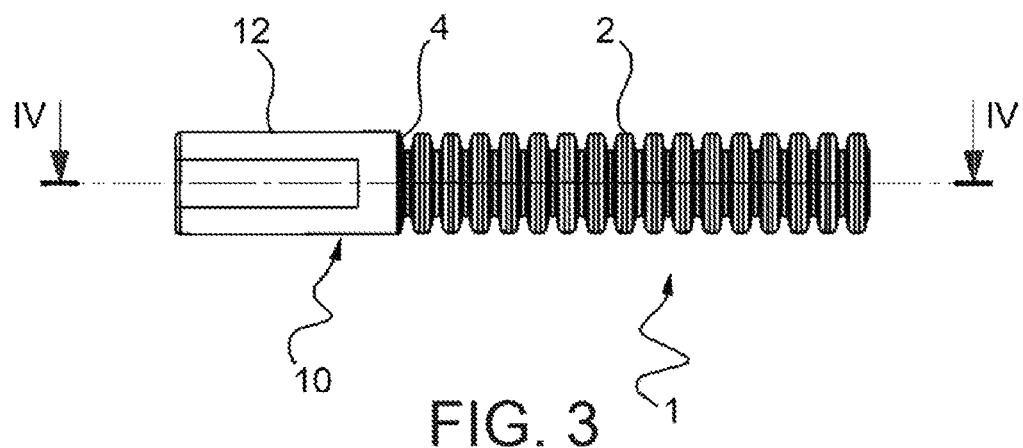
FIG. 3 is an elevational view of the tube of FIG. 1 rotated through 90 degrees relative to the longitudinal axis of the tube.
Figure 4:
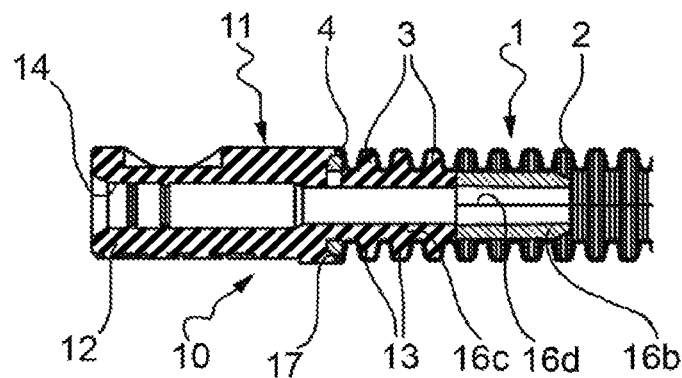
FIG. 4 is a section through the tube, taken on the line IV-IV of FIG. 3.
Figure 5:
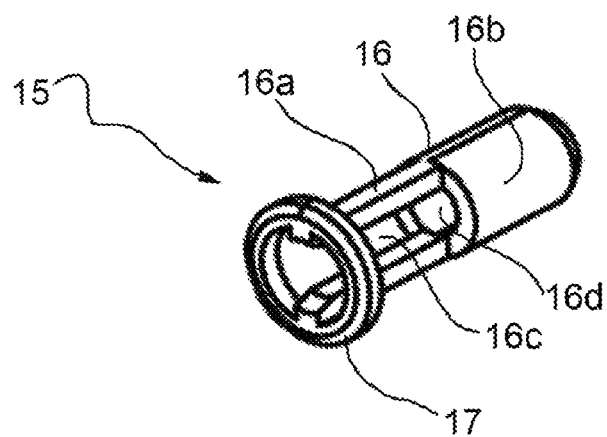
FIG. 5 is a perspective view of an insert of the end connector of the tube of FIG. 1.

The end connector 10 further comprises a tubular insert 15 which is made of plastics material and is partially incorporated in the elastomeric body 11. The insert 15 comprises a stem portion 16 extending inside the corrugated tube 1 and a flange or abutment portion 17 which is arranged at one end of the stem portion 16 and is in abutment with the end 4 of the corrugated tube 1. With reference in particular to FIG. 5 which shows the insert 15 alone, it can be seen that the stem portion 16 of the insert comprises a proximal zone 16a and a distal zone 16b. In the region of the proximal zone 16a, hereinafter defined as the anchorage zone, the side wall of the stem portion 16 has lateral passages or holes 16c which face the internal duct 16d of the insert 15. As can be seen in FIG. 2, the internal duct 16d of the insert 15 is slightly flared. In the region of the distal zone 16b of the stem portion 16 of the insert 15, hereinafter defined as the sealing zone, the lateral wall of the stem portion 16 is substantially continuous, that is free of lateral openings. The insert 15 as a whole is arranged in the tube 1 in a manner such that the side wall of the stem portion 16 is substantially in contact with the wall 2 of the corrugated tube 1. In the sealing zone 16b the contact affects the entire periphery of the cross-section of the lateral wall of the stem portion 16. The grooves 3 of the wall 2 of the tube 1 are thus isolated from one another (in a leaktight manner) in the sealing zone 16b whereas, in the anchorage zone 16a, the grooves 3 are connected to (in communication with) one another and to the internal duct 16d of the insert 15, by means of the lateral passages 16c. As can clearly be seen in FIG. 5, the lateral passages 16c also extend through the flange portion 17 of the insert 15. As shown in FIG. 4, the anchorage portion 13 of the elastomeric body 11 extends from the connection portion 12 of the body 11 so as to occupy the lateral passages 16c and to fill the grooves 3 of the corrugated wall 2 of the corrugated tube 1 that are in communication with the passages 16c, terminating at the level of the distal zone 16b of the stem portion 16 of the insert 15. In the embodiment illustrated, in the region of the anchorage zone 16a, the lateral wall of the stem portion 16 is reduced to a series of bridges which attach the flange portion 17 to the sealing zone 16b of the stem 16. However, the specific shape of the lateral passages 16c and of the sealing zone 16b of the insert 15 is not essential for the purposes of the invention, provided that it ensures controlled penetration of the elastomeric material between the tubular insert 15 and the corrugated wall 2 of the tube 1.

In the anchorage zone 16a, the stem portion 16 of the insert 15 is therefore attached to the corrugated tube 1 by means of the anchorage portion 13 of the elastomeric body 11. This attachment is achieved by mechanical anchorage, utilizing the undercuts defined by the grooves 3 of the corrugated wall 2 of the tube 1, and by chemical anchorage, by the selection of the materials of the tube 1, of the elastomeric body 11, and of the insert 15 in a manner such as to achieve chemical adhesion between them. The elastomeric material thus creates a single body with the tube 1 and with the insert 15.

Figure 6:
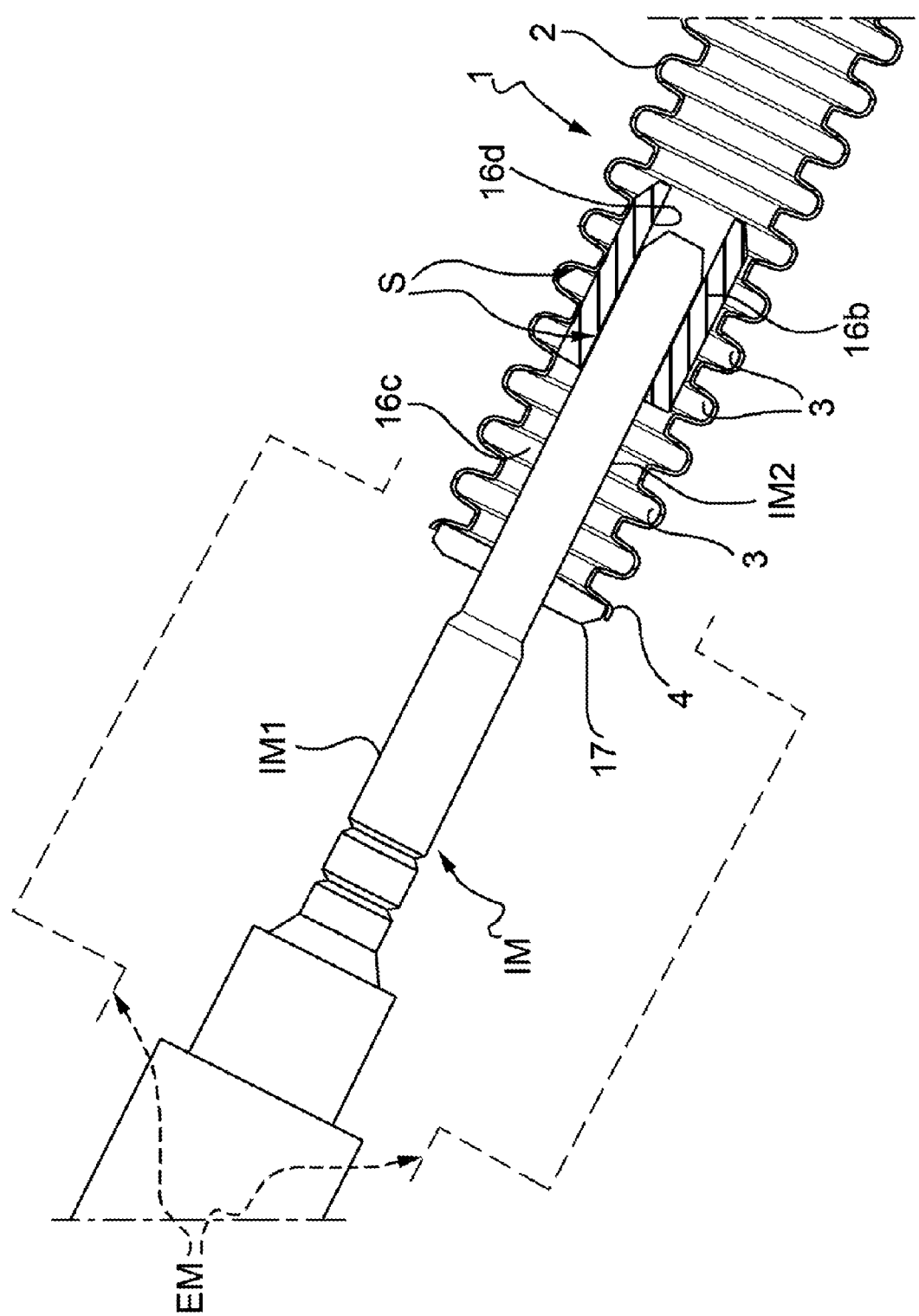
FIG. 6 is a partially sectioned, schematic view showing a step in the manufacture of the end connector of the tube of FIG. 1.

FIG. 6 shows how the elastomeric body 11 can be co-moulded onto the end 4 of the tube 1. For this purpose a mould is used which comprises a needle-shaped inner portion IM that can be inserted partially in the corrugated tube 1 and an outer portion EM (indicated schematically by a broken line) that can be closed as a shell around the end 4 of the tube 1. The inner portion IM comprises a proximal section IM1 the lateral surface of which is shaped so as to impart the desired profile to the internal duct 14 of the connection portion 12 of the elastomeric body 11 and a distal section IM2 which can engage inside the sealing zone 16b of the stem portion 16 of the insert 15, thus closing the internal duct 16d of the insert 15 in a leaktight manner. The outer portion EM of the mould, on the other hand, is shaped so as to impart the desired profile to the external surface of the connection portion 12 of the elastomeric body 11.

Basically, the manufacture of the end connector 10 comprises, initially, the insertion of the insert 15 in the corrugated tube 1 until the flange portion 17 of the insert 15 is brought into abutment with the end 4 of the tube 1. The inner portion IM of the mould is then inserted in the corrugated tube 1 until the distal section IM2 of the inner portion IM is brought into engagement with the sealing zone 16b of the stem portion 16 of the insert 15 and the outer portion EM of the mould is closed around the end 4 of the tube. The elastomeric material is then injected in conventional manner between the outer portion EM and the inner portion IM of the mould and also penetrates into the interior of the corrugated tube 1 through the portions of the lateral passages 16c which extend through the flange portion 17 of the insert 15, thus filling the lateral passages 16c and the grooves 3 of the corrugated wall 2 that are in communication therewith. The penetration of the elastomeric material is stopped by the sealing zone 16b of the stem portion 16 of the insert 15 by virtue of the seal S formed by the sealing zone 16b with the distal portion IM2 of the inner portion IM of the mould on one side and with the corrugated wall 2 of the corrugated tube 1 on the other side.

Now, reference is made to FIGS. 7 to 10. In the region of the end 4 of the tube shown in the drawings there is an end connector, generally indicated 110, suitable for connecting the tube 1 to an external component (not shown). The end connector 110 comprises a tubular elastomeric body 111 produced by the co-moulding of an elastomeric material onto the end 4 of the corrugated tube 1.

The elastomeric body 111 is constituted by a connection portion 112 which is arranged outside the corrugated tube 1 and by an anchorage portion 113 which is arranged at least partly inside the corrugated tube 1 so as to fill some grooves 3 of the corrugated wall 2 thereof. The connection portion 112 has an internal duct 114 which is shaped for a leaktight connection between the connector 110 and the above-mentioned external component. The profile of the internal duct 114 is established at the design stage, according to the profile of the external component to which the tube 1 is to be connected. The outside diameter of the connection portion 112 is advantageously the same as the outside diameter of the corrugated tube 1 so as to produce an element with uniform transverse dimensions, thus avoiding any dimensional interference in the regions through which the tube must pass during its installation.

Figure 9:
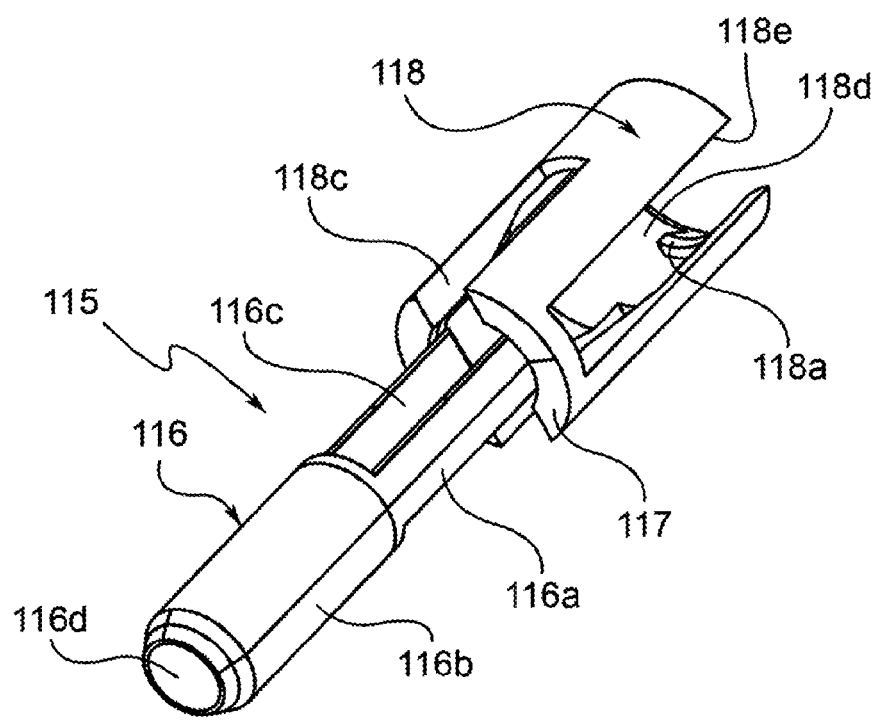
Figure 10:
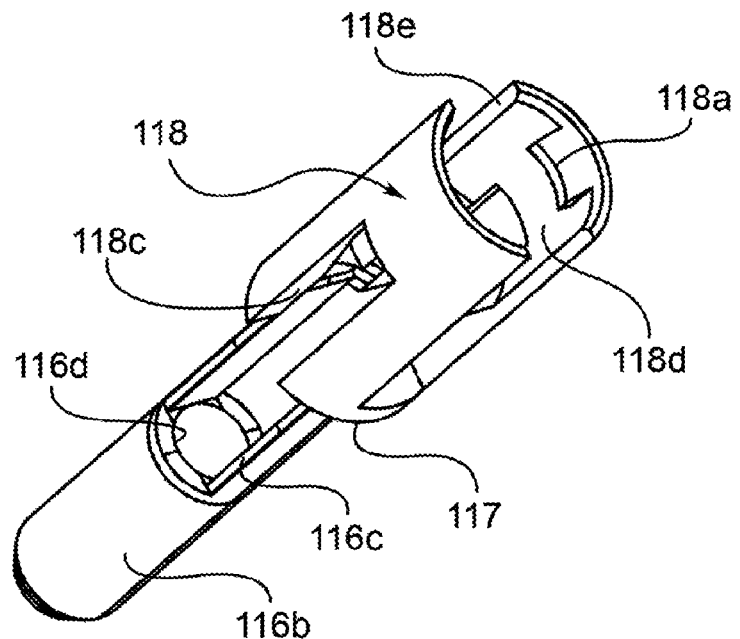

The end connector 110 further comprises a tubular insert 115 which is made of plastics material and is partially incorporated in the elastomeric body 111. The insert 115 comprises a stem portion 116 extending inside the corrugated tube 1 and an abutment portion 117 which is arranged at one end of the stem portion 16 and is in abutment with the end 4 of the corrugated tube 1. With reference in particular to FIGS. 9 and 10 which show the insert 115 alone, it can be seen that the stem portion 116 of the insert comprises a proximal zone 116a and a distal zone 116b. In the region of the proximal zone 116a, hereinafter defined as the anchorage zone, the side wall of the stem portion 116 has lateral passages or holes 116c which face the internal duct 116d of the insert 115. The internal duct 116d of the insert 115 may be slightly flared. In the region of the distal zone 116b of the stem portion 116 of the insert 115, hereinafter defined as the sealing zone, the lateral wall of the stem portion 116 is substantially continuous, that is free of lateral openings. The insert 115 as a whole is arranged in the tube 1 in a manner such that the side wall of the stem portion 116 is substantially in contact with the wall 2 of the corrugated tube 1. In the sealing zone 116b the contact affects the entire periphery of the cross-section of the lateral wall of the stem portion 116. The grooves 3 of the wall 2 of the tube 1 are thus isolated from one another (in a leaktight manner) in the sealing zone 116b whereas, in the anchorage zone 116a, the grooves 3 are connected to (in communication with) one another and to the internal duct 116d of the insert 115, by means of the lateral passages 116c. As can clearly be seen in FIGS. 9 and 10, the lateral passages 116c also extend through the abutment portion 117 of the insert 115. As shown in FIG. 8, the anchorage portion 113 of the elastomeric body 111 extends from the connection portion 112 of the body 11 so as to at least partly occupy the lateral passages 116c and to fill at least one of the grooves 3 of the corrugated wall 2 of the corrugated tube 1 that are in communication with the passages 116c, terminating at most at the level of the distal zone 116b of the stem portion 116 of the insert 115. Furthermore, a part of the anchorage portion 113 extends from the connection portion 112 of the elastomeric body 111 so as to embrace at least one of the grooves 3 of the corrugated wall 2 of the tube 1 from their outer side.

The insert 115 further comprises an engagement portion 118 which extends from the abutment portion 117 on the other side with respect to the stem portion 116. The engagement portion 118 of the insert is collar-shaped and is provided with engagement protrusions 118a, such as teeth, extending centripetally from the inner side of the engagement portion 118. The engagement protrusions 118a partly emerge into the internal duct 114 of the connection portion 112 for strengthening the leaktight connection between the connector 10 and the above-mentioned external component. The side wall of the engaging portion 118 has lateral passages or holes 118c which face the internal cavity 118d of the insert 115 aligned with the internal duct 116d. These passages 118c are aligned with the passages 116c of the stem portion 116 for allowing the elastomeric material to reach them and penetrate between the tubular insert 115 and the corrugated wall 2 of the tube 1. Furthermore, slots 118e are formed on the proximal end of the engagement portion 118 in order to confer increased elastic deformability to those parts of the engagement portions 118 supporting the engagement protrusions 118a.

In the embodiment illustrated in FIGS. 7 to 10, in the region of the anchorage zone 116a, the lateral wall of the stem portion 116 is reduced to a series of bridges which attach the abutment portion 117 to the sealing zone 116b of the stem 116. However, the specific shape of the lateral passages 116c and 118c and of the sealing zone 116b of the insert 115 is not essential for the purposes of the invention, provided that it ensures controlled penetration of the elastomeric material between the tubular insert 115 and the corrugated wall 2 of the tube 1.

In the anchorage zone 116a, the stem portion 116 of the insert 115 is therefore attached to the corrugated tube 1 by means of the anchorage portion 113 of the elastomeric body 111. This attachment is achieved by mechanical anchorage, utilizing the undercuts defined by the grooves 3 of the corrugated wall 2 of the tube 1, and by chemical anchorage, by the selection of the materials of the tube 1, of the elastomeric body 111, and of the insert 115 in a manner such as to achieve chemical adhesion between them. The elastomeric material thus creates a single body with the tube 1 and with the insert 115.

The elastomeric body 111 can be co-moulded onto the end 4 of the tube 1 in a way similar to the elastomeric body 11 of the preceding embodiment. For an explanation of its production method, reference is therefore to be made to the detailed description of FIG. 6.

Now, reference is made to FIGS. 11 to 17. In the region of the end 4 of the tube shown in the drawings there is an end connector, generally indicated 210, suitable for connecting the tube 1 to an external component (not shown). The end connector 210 is elbow-shaped and comprises a tubular elastomeric body 211 produced by the co-moulding of an elastomeric material onto the end 4 of the corrugated tube 1.

The elastomeric body 211 is constituted by a connection portion 212 which is arranged outside the corrugated tube 1 and by an anchorage portion 213 which is arranged around the end 4 of the tube 1 so as to fill some outer grooves 3 of the corrugated wall 2 thereof. The connection portion 212 has an internal duct 214 which is shaped for a leaktight connection between the connector 210 and the above-mentioned external component. The profile of the internal duct 214 is established at the design stage, according to the profile of the external component to which the tube 1 is to be connected. The outside diameter of the connection portion 212 is advantageously the same as the outside diameter of the corrugated tube 1 so as to produce an element with uniform transverse dimensions, thus avoiding any dimensional interference in the regions through which the tube must pass during its installation.

Figures 15, 16:
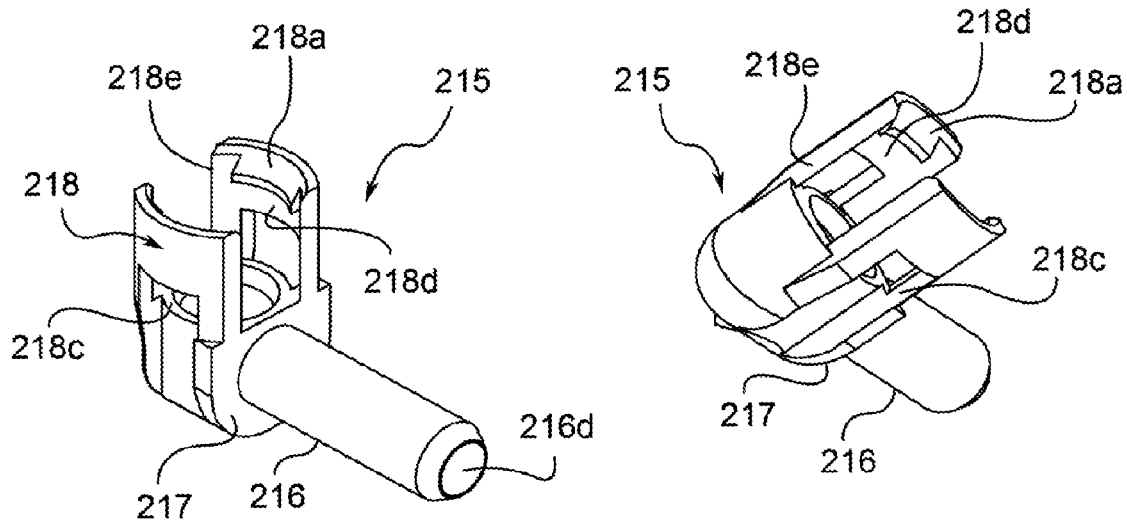
FIGS. 15 and 16 are perspective views of an insert of the end connector of the tube of FIG. 11.

The end connector 210 further comprises a tubular insert 215 which is made of plastics material and is partially incorporated in the elastomeric body 211. The insert 215 comprises a tubular stem portion 216 extending inside the corrugated tube 1 and an abutment portion 217 which is arranged at one end of the stem portion 216 and is in abutment with the end 4 of the corrugated tube 1. With reference in particular to FIGS. 15 and 16 which show the insert 215 alone, it can be seen that the stem portion 216 of the insert, hereinafter defined as the sealing zone, has a lateral wall which is substantially continuous, that is free of lateral openings. The internal duct 216d of the insert 215 may be slightly flared. The insert 215 as a whole is arranged in the tube 1 in a manner such that the side wall of the stem portion 216 is substantially in contact with the wall 2 of the corrugated tube 1. This contact affects the entire periphery of the cross-section of the lateral wall of the stem portion 216. The grooves 3 of the wall 2 of the tube 1 in contact with the stem portion are thus isolated from one another (in a leaktight manner). As shown in FIGS. 12 to 14, the anchorage portion 213 of the elastomeric body 211 extends from the connection portion 212 of the body 211 so as to embrace some of the grooves 3 of the corrugated wall 2 of the tube 1 from their outer side.

The insert 215 further comprises an engagement portion 218 which extends from the abutment portion 217 on the other side with respect to the stem portion 216 and is angled with respect to the stem portion 216. The engagement portion 218 of the insert is collar-shaped and is provided with engagement protrusions 218a, such as teeth, extending centripetally from the inner side of the engagement portion 218. The engagement protrusions 218a partly emerge into the internal duct 214 of the connection portion 212 for strengthening the leaktight connection between the connector 210 and the above-mentioned external component. The side wall of the engaging portion 218 has lateral passages or holes 218c which face the internal cavity 218d of the insert 215 which is angled with respect to the internal duct 216d. Furthermore, slots 218e are formed on the proximal end of the engagement portion 218 in order to confer increased elastic deformability to those parts of the engagement portions 218 supporting the engagement protrusions 218a.

The stem portion 216 of the insert 215 is therefore attached to the corrugated tube 1 by means of the anchorage portion 213 of the elastomeric body 211. This attachment is achieved by mechanical anchorage, utilizing the undercuts defined by the grooves 3 of the corrugated wall 2 of the tube 1, and by chemical anchorage, by the selection of the materials of the tube 1, of the elastomeric body 211, and of the insert 215 in a manner such as to achieve chemical adhesion between them. The elastomeric material thus creates a single body with the tube 1 and with the insert 215.

Figure 17:
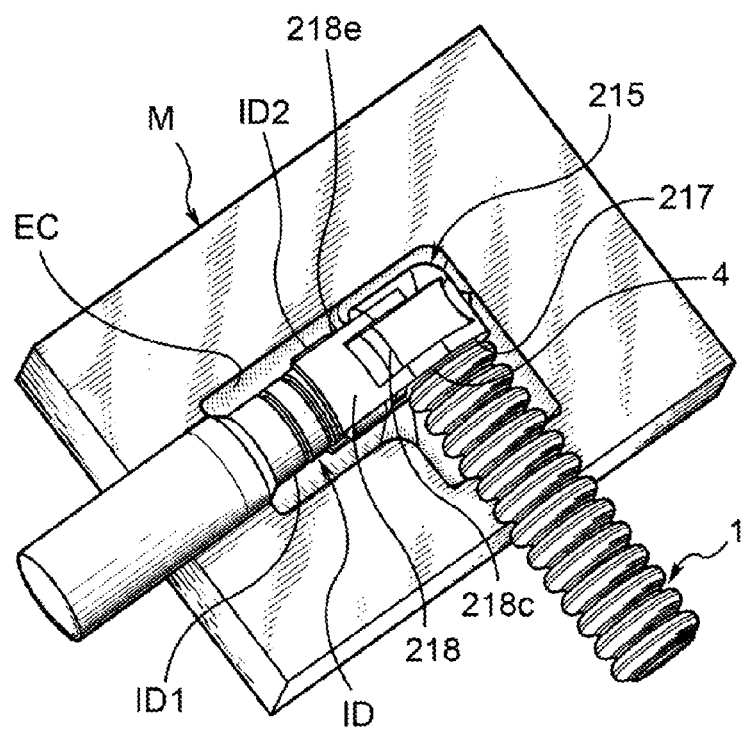
FIG. 17 is a partially sectioned, schematic view showing a step in the manufacture of the end connector of the tube of FIG. 11.

FIG. 17 shows how the elastomeric body 211 can be co-moulded onto the end 4 of the tube 1. This moulding process requires a mould M having an elbow-shaped cavity EC which can be closed as a shell around the end 4 of the tube 1 and a needle-shaped resin injection device ID that can be inserted partially in the insert 215. The injection device ID comprises a proximal section ID1 the lateral surface of which is shaped so as to impart the desired profile to the internal duct 214 of the connection portion 212 of the elastomeric body 211 and a distal section ID2 which can engage inside the engagement portion 218 of the insert 215, thus closing the internal cavity 218d of the insert 215 in a leaktight manner. The cavity EC of the mould, on the other hand, is shaped so as to impart the desired profile to the external surface of the connection portion 212 of the elastomeric body 211.

Basically, the manufacture of the end connector 210 comprises, initially, the insertion of the insert 215 in the corrugated tube 1 until the abutment portion 217 of the insert 215 is brought into abutment with the end 4 of the tube 1. The injection device ID is then inserted into the internal cavity 218d of the engagement portion 218, and the mould is closed around tube 1, insert 215 and injection device ID. The elastomeric material is then injected in conventional manner through lateral openings of the injection device (not shown), passes through the lateral passages or holes 218c of the side wall of the engaging portion 218 and penetrates into the cavity EC of the mould thus embedding the injection device ID, the insert 215 and the end 4 of the tube 1 within itself. The penetration of the elastomeric material between the abutment portion 217 of the insert 215 and the tube end 4 is prevented by the stem portion 216 of the insert 215 by virtue of the seal formed by the stem portion 216 with the corrugated wall 2 of the corrugated tube 1.

What is claimed is:

1. An end connector and a corrugated tube made of plastic material, comprising:
    a tubular elastomeric body co-moulded onto an end of the corrugated tube, wherein the elastomeric body comprises a connection portion arranged outside the corrugated tube and shaped for connection to an external component, and an anchorage portion arranged inside the corrugated tube to fill grooves of a corrugated wall of the corrugated tube; and
    a tubular insert made of plastic material and partially incorporated in the elastomeric body and which comprises a stem portion extending inside the corrugated tube and an abutment portion in abutment with the end of the corrugated tube, the stem portion comprising an anchorage zone provided with lateral passages, wherein in the region of the anchorage zone the stem portion of the insert is attached to the corrugated tube by the anchorage portion of the elastomeric body;
    wherein the anchorage zone coincides with a proximal zone of the stem portion of the insert and the lateral passages of the anchorage zone also extend through the abutment portion of the tubular insert, and wherein the anchorage portion of the elastomeric body extends from the connection portion of the elastomeric body to occupy the lateral passages and to fill at least a portion of the grooves of the corrugated wall of the corrugated tube that are in communication therewith.

2. A connector according to claim 1, wherein the anchorage portion of the elastomeric body extends from the connection portion of the elastomeric body to fill the grooves of the corrugated wall of the corrugated tube that are in communication therewith, terminating at the level of a distal zone of the stem portion of the tubular insert.

* * * * *